United States Patent [19]
Kiesow

[11] 3,980,102
[45] Sept. 14, 1976

[54] MIXING VALVE

[75] Inventor: Lutz A. Kiesow, Bethesda, Md.

[73] Assignee: Baxter Laboratories, Inc., Deerfield, Ill.

[22] Filed: Oct. 24, 1975

[21] Appl. No.: 625,548

[52] U.S. Cl. ............................ 137/625.48; 251/205
[51] Int. Cl.² ........................................... F16K 11/06
[58] Field of Search .......... 137/88, 607, 597, 625.4, 137/625.48; 251/205, 206

[56] References Cited
UNITED STATES PATENTS

| | | | |
|---|---|---|---|
| 1,059,317 | 4/1913 | Robinson | 137/625.48 X |
| 3,412,744 | 11/1968 | Batzloff | 137/607 X |
| 3,507,303 | 4/1970 | Wills | 137/625.48 |
| 3,761,054 | 9/1973 | Abdo | 137/625.48 X |

Primary Examiner—William R. Cline
Attorney, Agent, or Firm—H. Karl Saalbach; Richard G. Kinney

[57] ABSTRACT

Two gases are fed to a mixing valve having two outlets, and the proportions of the two gases, at each of the said outlets, is varied inversely in accordance with the position of a moveable portion of the mixing valve. If the back pressure at the two outlets is equal, and if the supply pressure of the two gases is equal, the proportioning of the two gases will be accurately determined by the adjustment of the valve. Thus, in an automatically controlled system requiring the presence of gases in time-variable proportions, proper proportioning can be achieved by the use of a mechanical valve, without the necessity of a gas testing analyzer and a feedback system for controlling an ordinary mixture proportioning valve.

9 Claims, 10 Drawing Figures

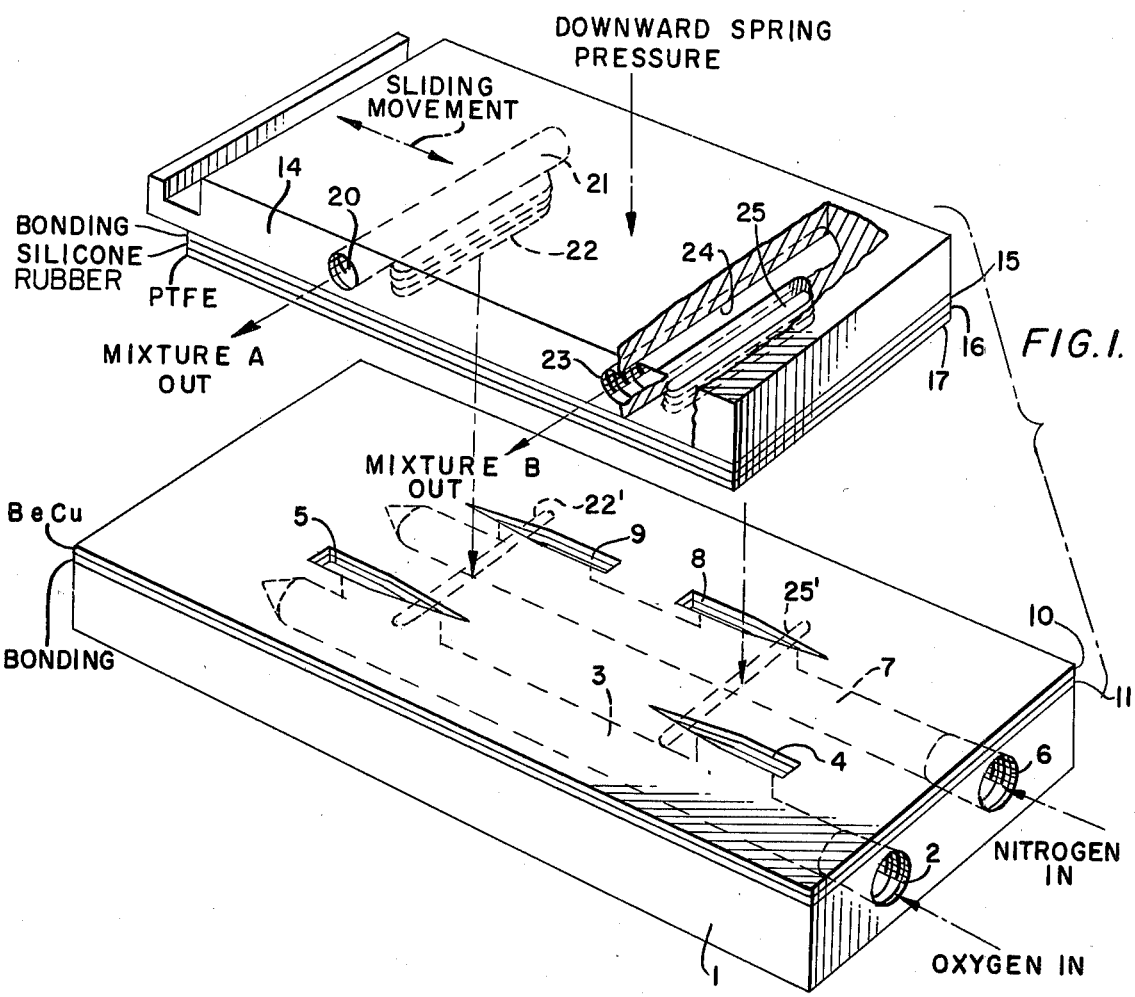
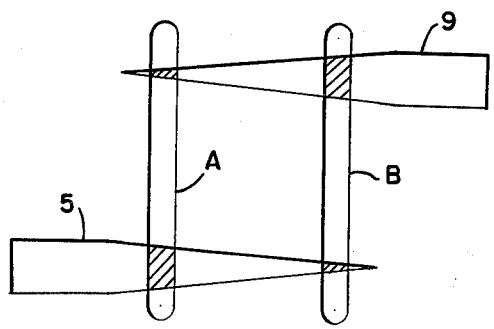
FIG. 2.
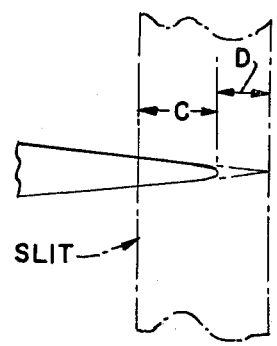
FIG. 3.

FIG. 6.
FIG. 7.
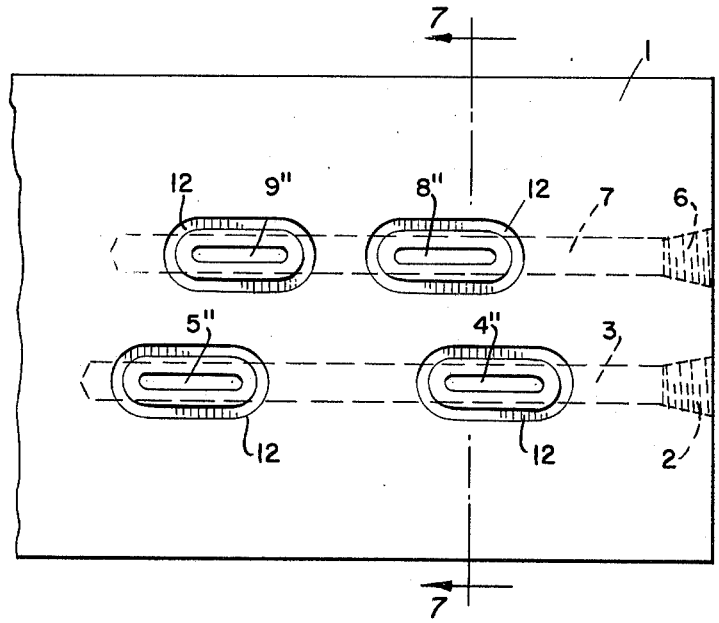
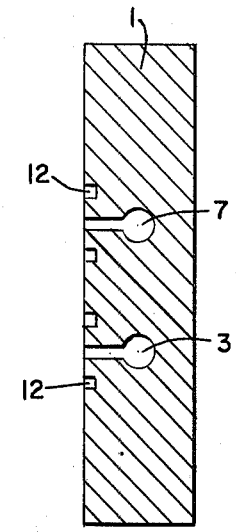
FIG. 8.
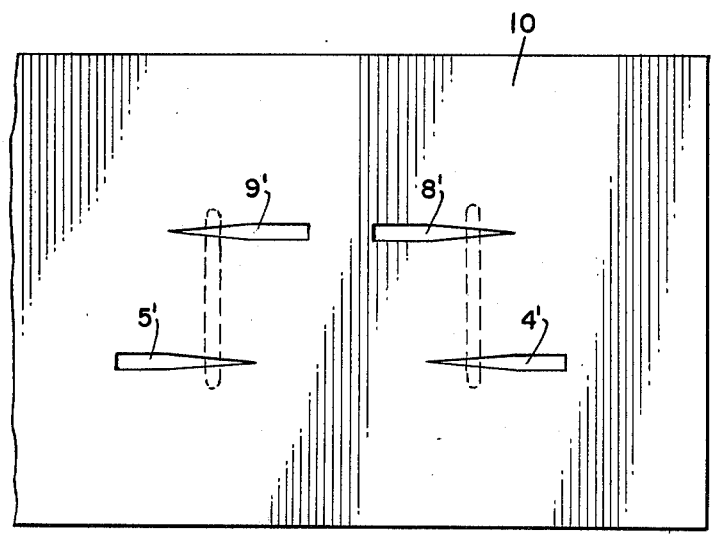
FIG. 9.
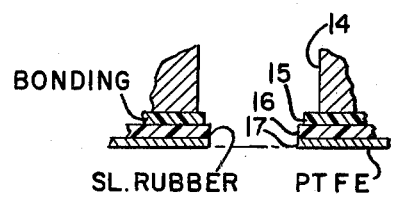
FIG. 10.
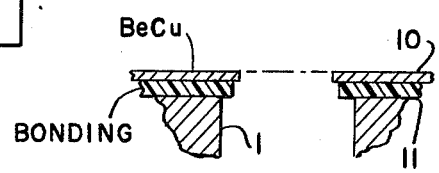

MIXING VALVE

CROSS REFERENCE TO RELATED APPLICATIONS

While the herein disclosed mixing valve is not closely related to another application, and is of general utility, it is particularly useful as a subcombination for supplying a time-variable oxygen content atmosphere to an apparatus for deriving oxygen association curves of blood samples, such as is disclosed in copending application Ser. No. 466,089 filed May 1, 1974, now abandoned.

The valve of this invention may also find utility when used with the apparatus disclosed in U.S. Pat. No. 3,904,296, entitled "Apparatus for Deriving Oxygen Association Rate Curves for Blood Samples," issued on Sept. 9, 1975, in the name of Lutz A. Kiesow; in U.S. Pat. No. 3,854,878, entitled "Method and Apparatus for Deriving Oxygen Association Rate Curves for Blood Samples," issued on Dec. 17, 1974, in the name of Lutz A. Kiesow; and in U.S. Pat. No. 3,787,124, entitled "Dual Wavelength Photometer for Absorbance Difference Measurements," issued on Jan. 22, 1974, in the names of George W. Lowy, Paul Priarone, and Herbert M. Cullis; all of which patents are assigned to the same assignee as is the present invention.

BRIEF SUMMARY OF INVENTION

A valve has two inlets and two outlets, with four passageways, each controllable to regulate flow, for permitting flow from each of the inlets to each of the outlets.

One part of the valve can slide on another part of the valve, and the four passageways extend across the sliding plane in such manner that as one pair of passageways opens up the other pair closes up, and so that proportion of one of the two gases supplied from the input ports varies, at one outlet, from 100% to 0% while it varies inversely, at the other outlet, from 0% to 100%.

The proportioning is controlled by the particular shape of the apertures at the plane of sliding, and involves the superposition of an acute triangular aperture with a perpendicular narrow slit, to form a composite aperture whose area varies with scanning movement of the slit along the length of the acute triangular aperture.

BRIEF DESCRIPTION OF DRAWINGS

FIG. 1 is an exploded and partly cross-sectional perspective view of the mixing valve;

FIG. 2 is a diagram showing how the area of a composite aperture varies as a narrow cross slit scans along the length of a triangular slit;

FIG. 3 is a diagram of the apex region of a triangular slit, useful for explaining the difference in laminar flow at the apex and turbulent flow away from the apex;

FIGS. 6 and 7 are respectively a top view and an end view cross section, taken on the plane 7—7 of FIG. 6, of the base of the mixing valve;

FIG. 8 is a top view of the beryllium copper facing for the base of the mixing valve;

FIGS. 9 and 10 are enlarged cross sections of the structures at the scanning slit port, taken longitudinally, and the metering port, taken transversely.

BACKGROUND OF INVENTION

Figure 4:
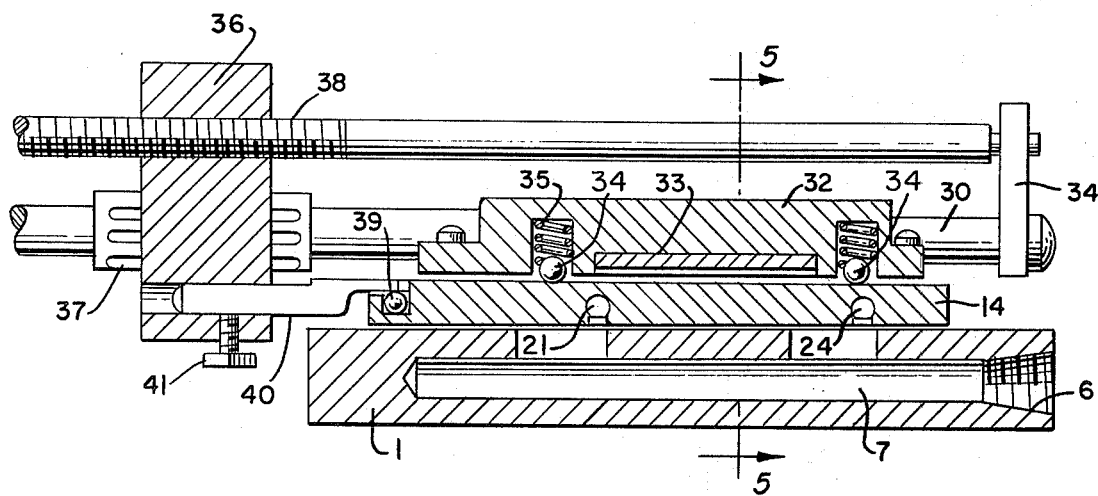
FIG. 4 is a longitudinal view, of one embodiment of the valve, the view being partly in cross section, taken on the plane 4—4 of FIG. 5.

The oxygen binding curve of blood is a plot of the oxygen concentration of the atmosphere to which the blood is exposed against the resulting optical properties of the blood. It will be remembered that blood which is well oxygenated is reddish, while blood which is lacking in oxygen is bluish.

The shape of the oxygen binding curve is of substantial physiological and clinical significance, as it furnishes information on the oxygen transport ability and health of the blood.

In the prior art it has been common to expose the blood sample in a chamber to an atmosphere which is varied by initially filling the test chamber with one gas, say nitrogen, inserting the sample, and then purging the chamber with the other gas, oxygen. Instrumentation, responsive to oxygen concentration in the chamber, controls the X-axis of a plotter while optical means, sensing the blood properties, controls the Y-axis of the plotter.

By means of the mixing valve of this invention, it is possible to directly and accurately control the oxygen concentration of the test chamber in a mechanical way, rather than indirectly by purging and measuring the resulting concentration. Furthermore, the movement of the mechanical control means is linearly related to the oxygen concentration achieved, so that it is simple to control the X-axis of the plotter in accordance with said movement.

DETAILED DESCRIPTION

In FIG. 1 the base 1 has an oxygen inlet connection 2 which is connected by way of oxygen duct 3 to metering ports 4 and 5. These two ports have tapered widths which vary oppositely, so that the tapers resemble arrowheads pointing at each other.

The base 1 also has a nitrogen inlet 6 which is connected by way of nitrogen duct 7 to metering ports 8 and 9. These two ports have tapered widths which also vary oppositely, but the tapers in this instance resemble arrowheads pointing away from each other.

The upper face of base 1, which is machined flat, is provided with a beryllium copper facing 10 which is cemented to the base 1 by means of a bonding lamina 11, which may be, for example, a silicone rubber composition.

The particular shape of the metering ports 4, 5, 8 and 9 is determined by apertures in the beryllium copper facing 10. A plan view of this facing is seen in FIG. 8. The apertures 4', 5', 8' and 9' are formed in the beryllium copper facing 10 by etching through photoresist masks. It has been found desirable to etch from both sides of the facing 10 in order to get squarely sharp apertures. The shape of apertures 4', 5', 8' and 9' determines the properties of metering ports 4, 5, 8 and 9, as will become clearer below.

The base 1, as seen in FIGS. 6 and 7, contains the ducts 3 and 7, which have branches 4", 5", 8" and 9" which extend to the face of base 1, against which the beryllium copper facing 10 is cemented. Each of the branches 4", 5", 8" and 9" is surrounded, at the said face, by one of the grooves 12. A groove 12, by supplying a flow path adjacent a branch, permits the copper beryllium facing 10 to be more readily cemented to the base 1.

Cooperating with the metering ports 4, 5, 8 and 9 is a slide member 14, which is normally pressed downward by spring pressure against the beryllium copper facing 10, but which is seen in FIG. 1 in a raised position to show the parts better. The lower face of slide member 14 is provided with a low friction facing of polytetrafluoroethelene 17, which is cemented to slide member 14 by means of a layer of silicone rubber 16 and a layer of bonding material 15.

The slide member 14 has a "Mixture A" outlet 20 which is connected by a bore 21 to a narrow scanning slit port 22. The slide member 14 also has a "Mixture B" outlet 20 which is connected by a bore 24 to narrow scanning slit port 25. When the slide member 14 is lowered to bring the PTFE facing 17 into contact with the beryllium copper facing 10, the scanning slit port 22 lowers to position 22', and the scanning slit port 25 lowers to position 25'. Each of scanning slit ports 22 and 25 can slide longitudinally, from the approximately mid-range position of 22' and 25', in the direction indicated by the double headed arrow labeled "sliding movement," and the total range of movement is approximately equal to the length of the taper of the metering ports 5 and 9.

The action of the scanning slit port 22 as it slides along metering ports 5 and 9 can be visualized in FIG. 2. The common areas defined by the intersection of the metering port and the scannng slit port is cross hatched. When the scanning slit port 22 is in position A, the intersection between 5 and A is large while that between 9 and A is small. Therefore, a large amount of oxygen flows into the scanning slit port 22, through the bore 21 and to the "Mixture A" outlet 20. At the same time, a small amount of nitrogen flows into scanning slit port 22, through the bore 21 and to "Mixture A" outlet. If the slit is in position B, the "Mixture A" outlet receives a mixture which is principally nitrogen with a small amount of oxygen.

The scanning slit port 25 moves along its metering ports 4 and 8 in ganged relationship with the movement of scanning slit port 22 along its metering ports 5 and 9. However, because metering ports 4 and 8 point oppositely to metering ports 5 and 9, respectively, the proportions of the mixture at the "Mixture B" outlet varies inversely with movement of slide member 14 while the proportions of the mixture at the "Mixture A" outlet vary directly with the movement of slide member 14. Thus, as the proportions of the oxygen and nitrogen at the "Mixture A" outlet will be varying in the sequence 100% and 0%; 50% and 50%; 0% and 100%, the proportions at the "Mixture B" outlet will, at the same time, vary sequentially in the inverse proportion, namely, 0% and 100%; 50% and 50%; 100% and 0%.

In order to ensure the proportioning stated above, it is necessary to supply the nitrogen and oxygen at pressures which are constant and equal and to exhaust the two outlets to receiving means offering constant and equal back pressures. For example, the "Mixture A" outlet may be connected to an experimental chamber which exhausts to the atmosphere. In that instance, the "Mixture B" outlet could be connected to a similar dummy chamber which also exhausts to the atmosphere, thereby achieving equal back pressures.

With constant and equal supply pressures and constant and equal back pressures, and using triangular metering ports, the proportioning of oxygen and nitrogen will almost exactly be a linear function of the displacement of slide member 14. The variable throttling orifice formed by the intersection of the metering port and the scanning slit port acts very much like a sharp edged orifice to the flow of the gases. The sharp edge can be seen in FIGS. 9 and 10, where no streamlining is evident. Since the pressure drop across the throttling orifice is constant, and since the sharp edges produce turbulent flow, it follows, for gases of low molecular weights, that the rate of flow depends principally on the area of the throttling orifice.

As the scanning slit port moves to the very point of the metering port, as shown in FIG. 3, the sides of the throttling orifice close in on the gas stream. As a result, the throttling orifice no longer acts as much as a sharp edged orifice, and the gas flow, at the constant pressure drop, changes from turbulent flow to laminar flow. It follows that for the same per unit area of throttling orifice, more gas will flow under laminar flow conditions when the throttling orifice is almost closed than when it is more widely open and turbulent flow prevails. Accordingly, if the pressure drop is suitably selected and the sides of the metering port are suitably profiled, as much gas will flow through the truncated triangle C of FIG. 3 under laminar flow conditions as would flow through the complete triangle C + D if the flow were turbulent.

To achieve exact linearity of proportion of the mixture with displacement of the slide 14, the sides of the metering orifices could be "shaded." As a practical matter, it has been found that straight sides for the triangle with an easily achieved radius of not more than 0.003 inches at the apex gives results which adequately satisfy the requirements for linearity in biological experiments.

Figure 5:
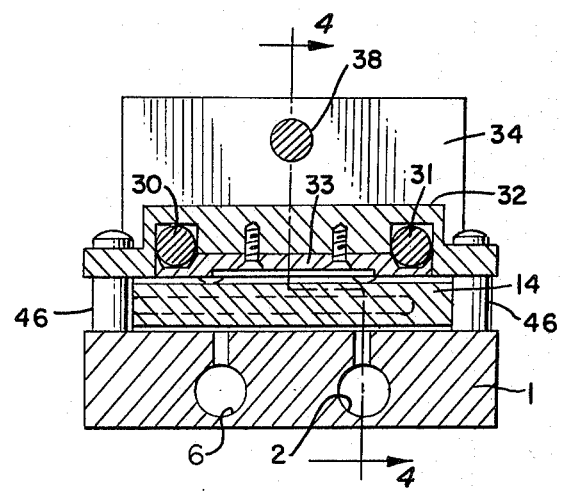
FIG. 5 is an end view of the valve, in cross section, taken on the plane 5—5 of FIG. 4.

The construction of an operating embodiment is shown in FIGS. 4 and 5. The base 1 and the slide member 14, already described, are seen. A downward pressure means, comprising of bracket 32 is situated above the slide 14. The bracket 32 is clamped to two slideway rods 30 and 31, by means of clamp 33. Clamp 33 and bracket 32 are biased towards each other, thereby clamping the slideway rods 30 and 31, by means of the two screws seen in FIG. 5. The slideway rods 30 and 31 are fastened to the framework of the equipment with which the mixing valve is used, and are therefore fixed in space. The bracket 8 supports the base 1 by means of screws and the spacing collars 46 seen in FIG. 5. The bracket 32 has recesses in which springs 35 are located, and these springs 35 press down on slide member 14 by way of balls 34. The slide member 14 is held snugly, as seen in FIG. 5, between spacing collars 46, and cannot therefore wander transversely. It is moved longitudinally by means of ball 39 which rides in a tight slot at the left end of slide member, as seen in FIG. 4. The ball is attached to push-pull bar 40 which is fixed to carriage 36 by means of clamping screw 41. The carriage 36 rides on slideway rods 30, using recirculating ball linear bearings 37. The carriage is driven by lead screw 38.

The oxygen inlet 2 and the nitrogen inlet 6 can be connected to the source of these gases by rigid tubing, since these inlets do not move with the carriage 36. The "Mixture A" outlet 20 and the "Mixture B" outlet 23 (FIG. 1) move with the movement of carriage 36, so these outlets are connected to their receiving means by flexible tubing.

An existing embodiment has been described above, but it is to be understood that the invention has obvious variations.

For example, the two inlets can be interchanged with the two outlets, without change of overall function, for the valve is fully reversible and will operate equally well as a proportioning valve whether the ducts in the slide 14 or the ducts in the base 1 are used as the inlets for the two gases to be mixed.

Nor is it necessary for the metering ports to be arranged, as shown, in a roughly rectangular configuration. Another configuration, such as single file, can be used by providing each of the four metering ports with an individual scanning slit port and providing suitable ductwork. Furthermore, the mixing valve, although described in connection with the mixing of oxygen and nitrogen, obviously can be used with other gases, such as oxygen and helium (as in deep sea diving) and it can be used with fluids. However, the calibration of the proportioning of the valve will change when gases of high molecular weight, such as carbon dioxide, are used, and will change even more if two liquids are mixed. Under these conditions, the valve can obviously be recalibrated, so that the mixture ratio, as a function of slide displacement, which is no longer linear, will be known.

I claim:

1. A mixing valve for mixing two fluids in any desired proportion in accordance with the movement of a portion of said valve, comprising:
   a first member having a smooth face and a second member having a smooth face;
   means to relatively and rectilinearly move said first and second members with respect to each other in a longitudinal direction through a limited operating range, with the said smooth faces sliding on each other in fluid-tight contact;
   first, second, third and fourth metering ports in the smooth face of said first member, each of said metering ports being of tapered shape, and extending in the longitudinal direction and having, along an operating extent, a width, measured in a direction transverse to said longitudinal direction, which varies monotonically along said longitudinal direction, the sense of variation of said first and third metering ports being identical and the sense of variation of said second and fourth ports being opposite to the sense of variation of said first and third ports;
   scanning port means in said second member for cooperating with each of said metering ports, said scanning port means comprising plural, narrow slits extending transversely of said longitudinal direction, and being so located that each of the metering ports is concommitantly scanned over its said operating extent by its cooperating slit as the first and second members move relatively and rectilinearly with respect to each other over said limited operating range;
   each of said first, second, third and fourth metering ports and its cooperating narrow slit respectively defining first, second, third and fourth variable throttling valves, the hydraulic resistance of each of which varies monotonically with relative movement of said first and second members over said limited range, the hydraulic resistance of said first and third variable throttling valves varying in one sense, and that of the second and fourth variable throttling valves varying in the opposite sense with said relative movement.

2. The mixing valve of claim 1 further comprising:
   duct means for connecting a first inlet connection to said first and fourth variable throttling valves;
   duct means for connecting a second inlet connection to said second and third variable throttling valves;
   duct means for connecting a first outlet connection to said first and second throttling valves;
   duct means for connecting a second outlet connection to said third and fourth throttling valves;
   whereby each throttling valve is connected to both one inlet and one outlet connection, and two fluids supplied respectively to said first and second inlet connection are variably mixed in accordance with said relative and rectilinear movement of said first member and said second member, and are delivered to said first outlet connection in a mixture directly varying in proportion to said movement and are delivered to said second outlet connection in a mixture varying inversely in proportion to said movement.

3. The mixing valve of claim 2 in which
   one of the first and second members is faced on its smooth face with a sheet of beryllium copper.

4. The mixing valve of claim 3 in which
   a layer of elastomeric material bonds the sheet of beryllium copper to the said smooth face.

5. The mixing valve of claim 2 in which
   one of the first and second members is faced on its smooth face with a sheet of polytetrafluoroethylene.

6. The mixing valve of claim 5 in which
   a layer of elastomeric material bonds the sheet of polytetrafluoroethylene to the said smooth face.

7. The mixing valve of claim 2 in which
   one of the first and second members is faced on its smooth face with a sheet of beryllium copper; and
   the other of said first and second members is faced on its smooth face with a sliding sheet of polytetrafluoroethylene.

8. The mixing valve of claim 2 in combination with:
   means for supplying each of said first and second inlet connections with an individual source of fluid at equal pressures; and
   means for connecting each of first and second outlet connections to individual receiving means having equal back pressures.

9. The mixing valve of claim 8 in which each of the said fluids is a gas.

* * * * *